US012718562B2

(12) United States Patent
Singh et al.

(10) Patent No.: US 12,718,562 B2
(45) **Date of Patent: *Aug. 25, 2026**

(54) ELECTRONIC MONITORING SYSTEM AND METHOD HAVING DYNAMIC ACTIVITY

(71) Applicant: Arlo Technologies, Inc., Carlsbad, CA (US)

(72) Inventors: Rajinder Singh, San Jose, CA (US); Mikio Yves Matsuo, Vancouver (CA); Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,711

(22) Filed: Feb. 14, 2024

(65) Prior Publication Data

US 2024/0185610 A1 Jun. 6, 2024

Related U.S. Application Data

(63) Continuation-in-part of application No. 18/541,728, filed on Dec. 15, 2023, which is a (Continued)

(51) Int. Cl.

*G06V 20/52* (2022.01)
*G06T 5/50* (2006.01)

(Continued)

(52) U.S. Cl.

CPC ................ *G06V 20/52* (2022.01); *G06T 5/50* (2013.01); *G06T 5/70* (2024.01); *G06T 7/20* (2013.01);

(Continued)

(58) Field of Classification Search

None

See application file for complete search history.

(56) References Cited

U.S. PATENT DOCUMENTS

| | | | | |
|---|---|---|---|---|
| 9,489,745 | B1 * | 11/2016 | Heitz, III | H04N 23/20 |
| 10,404,947 | B2 * | 9/2019 | Kitagawa | G08B 29/22 |

(Continued)

*Primary Examiner* — Daniel T Tekle

(74) *Attorney, Agent, or Firm* — Boyle Fredrickson, S.C.

(57) ABSTRACT

An electronic monitoring system and a method of dynamically altering an activity zone within the electronic monitoring system are provided. The electronic monitoring system includes a camera having a first field-of-view and operating to generate a first image data. A user device is configured to receive the first image data; define an activity zone at a first area within the first image data; define a triggering event; and define an object in the first field-of-view. A computer-readable memory stores the data corresponding to the object. An electronic processor executes a stored program and receives the image data from the camera to generate an alert in response to the occurrence of a triggering event. If a camera in the electronic monitoring system has moved such that the field of view has changed since the activity zones were created by the user, then the electronic monitoring system may dynamically update the configured activity zones based, for example, on a computer vision analysis of the previously configured activity zones.

19 Claims, 7 Drawing Sheets

Related U.S. Application Data continuation-in-part of application No. 17/724,953, filed on Apr. 20, 2022.

(60) Provisional application No. 63/178,852, filed on Apr. 23, 2021.

(51) Int. Cl.

| | |
|---|---|
| ***G06T 5/70*** | (2024.01) |
| ***G06T 7/20*** | (2017.01) |
| ***G06T 11/60*** | (2006.01) |
| ***G06V 20/40*** | (2022.01) |
| ***H04N 23/695*** | (2023.01) |

(52) U.S. Cl.

CPC .............. *G06T 11/60* (2013.01); *G06V 20/44* (2022.01); *H04N 23/695* (2023.01); *G06T 2207/20221* (2013.01); *G06V 2201/07* (2022.01)

(56) References Cited

U.S. PATENT DOCUMENTS

| | | | | |
|---|---|---|---|---|
| 10,489,453 | B2 * | 11/2019 | Duda | G06F 16/7867 |
| 2007/0035627 | A1 * | 2/2007 | Cleary | H04N 21/4223 348/E7.086 |
| 2007/0146484 | A1 * | 6/2007 | Horton | H04N 5/77 348/E7.086 |
| 2011/0102588 | A1 * | 5/2011 | Trundle | G08B 13/1966 348/143 |
| 2011/0157368 | A1 * | 6/2011 | Jo | H04N 7/181 348/E7.085 |
| 2013/0162838 | A1 * | 6/2013 | Huang | H04N 7/181 348/169 |
| 2018/0176512 | A1 * | 6/2018 | Siminoff | G06V 10/235 |
| 2019/0238786 | A1 * | 8/2019 | Takahashi | H04N 21/4316 |
| 2021/0398281 | A1 * | 12/2021 | Lys | H04N 23/56 |
| 2023/0154296 | A1 * | 5/2023 | Jacob | G06V 10/235 348/143 |
| 2024/0137653 | A1 * | 4/2024 | Singh | H04N 23/62 |
| 2024/0185610 | A1 * | 6/2024 | Singh | G06T 5/50 |

* cited by examiner 64
68a
66
68b 64
72
68a
68b
62f
72
70c
66
72
70a
70b
72
72
72

64
62g
72′
68a
70a′
70c′
72′
68b
66
72′
72′

ELECTRONIC MONITORING SYSTEM AND METHOD HAVING DYNAMIC ACTIVITY

CROSS-REFERENCE TO A RELATED APPLICATION

This application is a continuation-in-part of U.S. application Ser. No. 18/541,728, filed Dec. 15, 2023, entitled "ELECTRONIC MONITORING SYSTEM AND METHOD HAVING DYNAMIC ACTIVITY ZONES, which is a continuation-in-part of U.S. application Ser. No. 17/724,953, filed Apr. 20, 2022, entitled "SMART SECURITY CAMERA SYSTEM WITH AUTOMATICALLY ADJUSTABLE ACTIVITY ZONE AND METHOD", which is hereby incorporated by reference, which in turn claims the benefit of U.S. provisional patent application No. 63/178,852, filed on Apr. 23, 2021 and entitled "SMART SECURITY CAMERA SYSTEM WITH AUTOMATICALLY ADJUSTABLE ACTIVITY ZONE AND METHOD", the entire contents of which are hereby expressly incorporated by reference into the present application

FIELD OF THE INVENTION

This invention relates generally to a monitoring system that uses dynamic activity zones within a monitored area, and in particular, to a method of dynamically modifying the position of activity zones within a monitored area in response to a change in a field-of-view of a monitoring device. The invention additionally relates to a system that implements such a method.

BACKGROUND OF THE INVENTION

Cameras and electrical sensors have long been used as part of monitoring and/or surveillance systems. More recently, cameras have been coupled to electronic sensors to detect triggering events, such as a detected motion, to allow recording of an area once a triggering event has occurred. Video cameras and other related sensors have also been connected to computers with network access to allow advanced processing of the monitored area. Such processing capabilities may include the ability to identify and categorize triggering events occurring within the monitored area or a subset of the monitored area. For example, a particular motion triggering event occurring within a specified area may initiate processing of the captured video content by the system to identify and categorize the motion as being attributable to the presence of a person broadly, or as a particular individual more specifically.

In such systems, background motion (traffic, etc.) can produce undesired, repeated false triggering, resulting in undesired transmissions and recording. For this reason, it is known to allow the user to define custom "activity zones" within the camera field-of-view or monitored area. An activity zone defines a limited area in which triggering will occur with triggering not occurring outside of that area. This permits triggering and resulting image capture and transmission in areas of interest while avoiding triggering in areas where there may be background or nuisance motion. In one example, one or more activity zones may be drawn on an image from the camera, for example, positioned to cover a front entranceway or door, but to exclude a nearby portions of the image such as a tree branch or a street. Movement of the tree branch or traffic on the street thereafter would not trigger image capture and transmission. Multiple different activity zones can be defined for use at the same time (in different portions of the image) and/or at different times (for example, during the day or the evening).

While these monitoring systems are versatile and work very well for their intended purpose of monitoring an area, they have limitations. For example, user specified activity zones often are defined during the installation process as a portion of a field-of-view of a camera. However, the field-of-view of the camera may be subject to change, either intentionally or otherwise, while the activity zone remains independently fixed, irrespective of the change to the field-of-view of the camera. For example, a camera may be moved to a new position or, more typically, orientation during a battery change operation. Another use case could be where the camera is mounted on a moving/rotary mount and activity zones are defined to exclude specific types of objects (e.g. trees, billboards etc.), and/or to include specific areas (e.g. driveway, doorway etc.), As such, the activity zones may no longer correspond to their intended target after a camera has been repositioned or has moved. The system thus is prone to false triggers by sensing motion in areas no longer correspond to the intended activity zone(s). Alternatively, such a system may require a user to manually redefine activity zones after every repositioning of the camera.

In the context of a monitoring system, it is desirable to provide a system for both identifying modifications to the field-of-view of the camera and also modifying the activity zones to correspond to the change in the field-of-view as to allow the activity zones to continue to operate accurately without interruption.

SUMMARY OF THE INVENTION

In accordance with a first aspect of the invention, a system and method of modifying activity zones in response to a change in a camera's field-of-view is provided.

In accordance with the present invention, a method of area monitoring. The method includes generating a first image data with a camera having a first field-of-view and defining a first activity zone at a first area within the first image data. The first activity zone is analyzed for an object and the first activity zone is updated in response to one of movement of the camera and movement of the object.

Updating the first activity zone additionally includes generating a second image data having a second field-of view that differs at least in-part from the first field-of-view. The first activity zone is modified to be at a second area within the second image data that corresponds to the first area within the first image data. A triggering event occurring within the first activity zone of the second area is responded. The first image data includes a plurality of activity zones including the first activity zone and at least one additional activity zone. Each activity zone of the plurality of activity zones is configured to be modified from the corresponding first area within the first image data to the corresponding second area within the second image data.

The camera from a first position corresponding to the first field-of-view to a second position corresponding to the second field-of-view. The camera may be repositioned from a group comprising horizontal panning, vertical tilting, rotation and combinations thereof. The camera view may be digitally scanned between the first field-of-view and the second field-of-view, wherein the first field-of-view and the second field-of-view are each a subset of a third field-of-view.

The first activity zone includes a user defining polygon end points within the first image data and defines one or more responses to at least one triggering event occurring within the first activity zone. The first and second image data may be provided to a computer vision system and the polygon end points may be positioned within the second image data that correspond to the user defined polygon end points within the first image data. The computer vision system applies one or more of image classification, edge detection, object detection, object tracking, and segmentation.

In accordance with a further aspect of the present invention, a method of area monitoring is provided. The method includes generating a first image data with a camera having a first field-of-view and defining an activity zone within the first image data. A triggering event is defined. The triggering event occurs in at least one of the interior of the activity zone and the exterior of the activity zone. A response occurs to the triggering event.

A second image data having a second field-of view that differs at least in-part from the first field-of-view may be generated. The activity zone is modified to be at a second area within the second image data that corresponds to the first area within the first image data. The modified activity zone(s) may be created by doing a computer vision analysis of objects/areas/zones included and/or excluded in the first field-of-view and recreating the updated activity zone(s) in the second field-of-view. An object may be defined in the first field-of-view. Data corresponding to an identity of the object is stored. The camera is repositioned to a position corresponding to the second field-of-view. It is determined if the object is in second field-of-view utilizing the data corresponding to the identity of the object. Alternatively, the object may be a first object of a plurality of objects in a family. The data corresponding to the object is stored and the camera may be repositioned to a position corresponding to the second field-of-view. Thereafter, it may be determined if a second object of the plurality of objects is in second field-of-view utilizing the data corresponding to the object. The object in the first field-of-view may be masked, blurred, and/or overlayed, and if the object is in the second field-of-view, the object may also be masked, blurred, and/or overlayed in the second field-of-view. The system may also mask and/or mute the audio associated with the object(s).

In accordance with a still further aspect of the present invention, an electronic monitoring system is provided. The electronic monitoring system includes a camera having a first field-of-view and operating to generate a first image data. A user device is configured to receive the first image data; define an activity zone at a first area within the first image data; define a triggering event; and define an object in the first field-of-view. The triggering event may occur in at least one of the interior of the activity zone and the exterior of the activity zone. Computer-readable memory is provided for storing the data corresponding to object. An electronic processor executes a stored program and receives the image data from the camera to generate an alert in response to the occurrence of a triggering event.

The camera is moveable between a first position wherein the camera has the first field-of-view and a second position wherein the camera has a second field-of view that differs at least in-part from the first field-of-view and generates a second image data. The electronic processor is configured to modifying the activity zone to be at a second area within the second image data that corresponds to the first area within the first image data. The stored program may include a computer vision system configured to apply one or more techniques selected from a group comprising image classification, edge detection, object detection, object tracking, and segmentation to identify a difference between the first image data and the second image data and in response position polygon end points within the second image data that correspond to the user defined polygon end points within the first image data as to define the activity zone to be at a second area within the second image data that corresponds to the first area within the first image data. In addition, the stored program may be configured to determine if the object is in second field-of-view utilizing data corresponding to the object and to mask the object in the first field-of-view, and if the object is in the second field-of-view, mask the object in the second field-of-view. Alternatively, the object may be a first object of a plurality of related objects wherein the stored program may be configured to determine if a second object of the plurality of related objects is in second field-of-view utilizing data corresponding to the object.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRA WINGS

Preferred exemplary embodiments of the invention are illustrated in the accompanying drawings in which like reference numerals represent like parts throughout, and in which:

FIG. 1 is a schematic representation of an electronic monitoring system according to aspects of the invention;

FIG. 2 schematically illustrates the internal circuitry of one the monitoring devices of the system of FIG. 1;

DETAILED DESCRIPTION OF THE DRAWINGS

Figure 1:
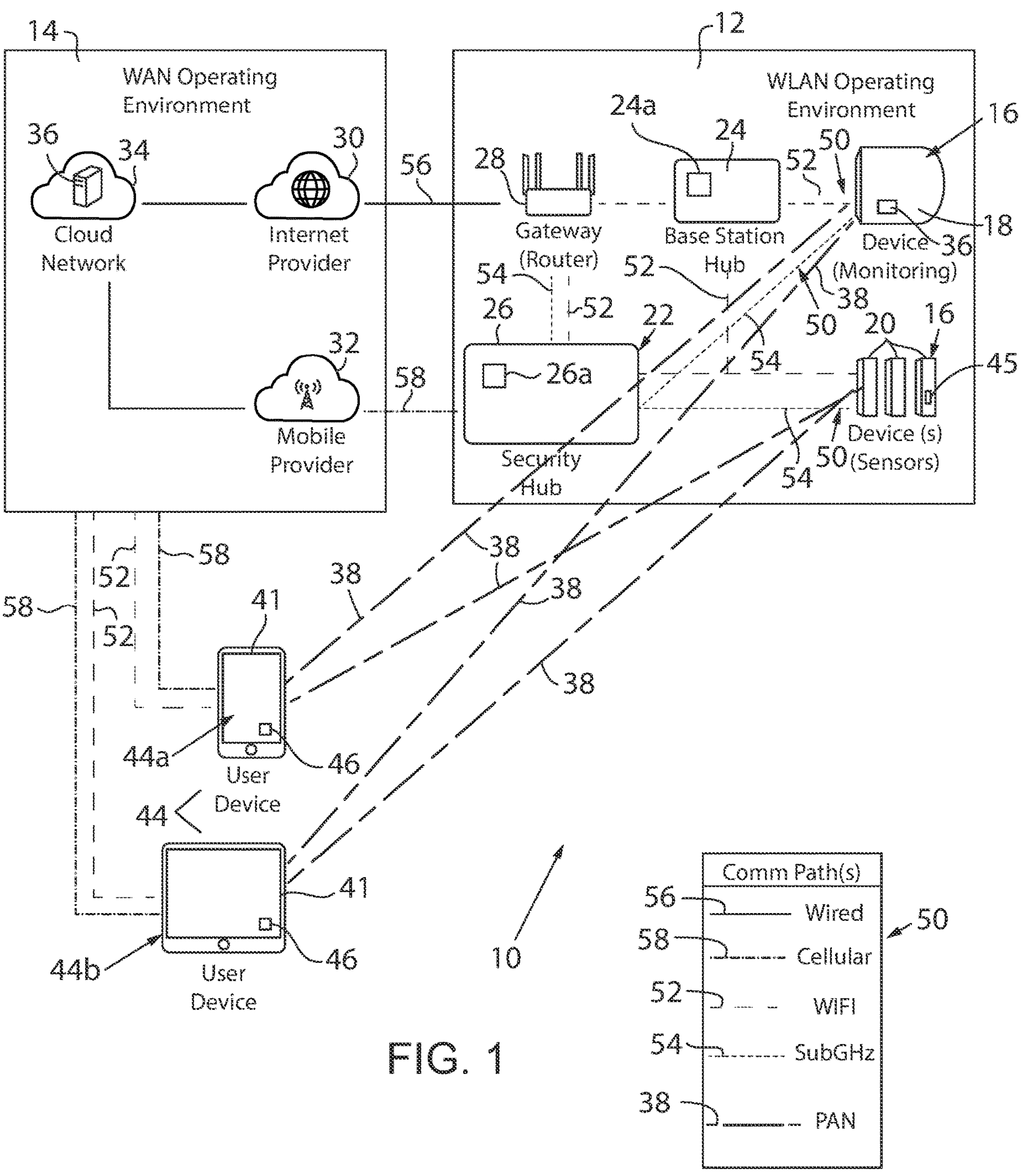

Referring to FIG. 1, an electronic monitoring system 10 constructed in accordance with an aspect of the present invention is generally designated by the reference numeral 10. Electronic audience monitoring system 10 is implemented in a wireless communication operating environment. For example, wireless communication may be implemented by a WLAN (wireless local area network) operating environment (WLAN 12) or by direct Bluetooth® or any communications technology on a personal area network (PAN) between the various components of electronic audience monitoring system 10 and one or more audio and/or video media playback devices, i.e., user devices 44, including but not limited to a mobile device 44*a* or television 44*b*, as hereinafter described.

In the depicted embodiment, WLAN 12 is communicatively connected to a WAN (wide area network) operating environment, designated by the reference numeral 14. Within WLAN 12, various client devices 16, such as monitoring devices 18 and sensors 20, are wirelessly networked to a base station or high frequency hub 24 which, in turn, communicates with the WAN 14 via a gateway hub, shown as gateway router 28. Base station hub 24 includes a processor 24*a* for providing internal computing capabilities, as hereinafter described. Base station hub 24 and router 28 provide a high frequency connection to WAN 14. Base station hub 24 may be eliminated as a stand-alone module if its functionality is incorporated into gateway router 28, in which case gateway router 28 also serves as a base station hub. The system may also include a security hub 26 that communicates with monitoring device(s) 18 and with the WAN 14 and provides a low frequency connection between the WAN 14 and monitoring devices 18. If present, security hub 26 may also communicate with the router or hub 28, such as through a high frequency connection path 52 and/or a low frequency connection 54 path to the router 28. The security hub 26 is also provided with a processor 26*a* for providing internal computing capabilities, as hereinafter described, and has the capability of providing a high frequency connection with monitoring devices 18. A public key for encrypting data transmitted by base station hub 24 and/or security hub 26 may be saved thereon. As is known, a public key is a cryptographic key comprising a mathematical algorithm implemented in software (or hardware) that may be used to encrypt data. The public key is a string of bits that are combined with the data using an encryption algorithm to create ciphertext, which is unreadable. In order to decrypt the encrypted data, a private key must be used. As is known, a private key is a cryptographic key comprising a mathematical algorithm implemented in software (or hardware) that may be used to decrypt data encrypted utilizing a public key. The private key decrypts the encrypted data back to plaintext, which is readable. The private key is saved in a memory in one or more of the user devices 44.

Still referring to FIG. 1, gateway router 28 is typically implemented as a WIFI hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into router 28, in which case router 28 becomes the base station hub, as well as, the router. Another connection between WLAN 12 and WAN 14 may be provided between security hub 26 and mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of electronic monitoring system 10 to interact with a backend system or control services that can control functions or provide various processing tasks of components of system 10, shown as a cloud-based backend control service system 34, which could be an Arlo SmartCloud™ system. The backend system, such as the cloud-based control service system 34, includes at least one server 36 and typically provides, for example, cloud storage of events, AI (artificial intelligence) based processing such as computer vision, system access to emergency services and computer-readable memory. The public key may also saved in computer-readable memory associated with cloud-based control service system 34, for reasons hereinafter described.

As noted above, electronic monitoring system 10 typically includes one or more monitoring devices 18 and/or sensors 20 that are mounted to face towards a respective area being monitored, such as exterior or interior area. It is intended for monitoring devices 18 and/or sensors 20 to perform a variety of monitoring, sensing, and communicating functions. Each monitoring device 18 includes a firmware image stored in non-volatile memory thereon. As is conventional, the firmware image acts as the monitoring device's complete operating system, performing all control, monitoring and data manipulation functions. In addition, the public key may also saved in computer-readable memory associated with each monitoring device 18.

Figure 2:
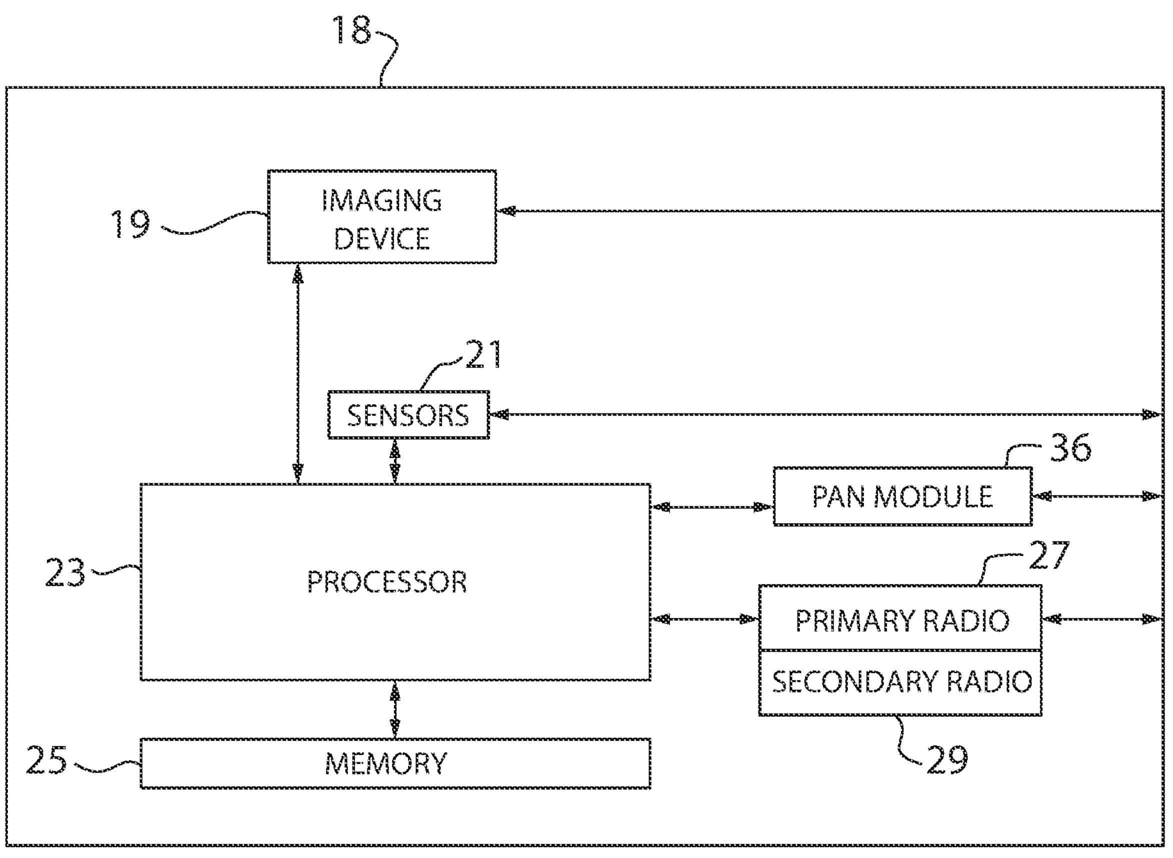

Referring to FIG. 2, by way of nonlimiting example, one such monitoring device 18 may include an imaging device 19, such as a smart camera, that is configured to capture, store and transmit visual images and/or audio recordings of the monitored area within the environment, e.g., an Arlo® camera available from Arlo Technologies, Inc. of Carlsbad, California. In addition to containing a camera, the monitoring device 18 may also include one or more sensors 21 configured to detect one or more types of conditions or stimulus, for example, motion, opening or closing events of doors, temperature changes, etc. Instead of or in addition to containing sensors, monitoring device 18 may have audio device(s) such as microphones, sound sensors, and speakers configured for audio communication. Other types of monitoring devices 18 may have some combination of sensors 20 and/or audio devices without having imaging capability. Sensors 20 or other monitoring devices 18 also may be incorporated into form factors of other house or building accessories, such as doorbells, floodlights, etc.

Still referring to FIG. 2, each monitoring device 18 includes circuitry, including a main processor 23 and/or an image signal processor, and computer-readable memory 25 associated therewith. It is further contemplated to store the public key in computer-readable memory associated with each monitoring device 18. The circuitry, the main processor 23, the computer-readable memory 25 and the public key are configured to allow the monitoring device 18 to perform a variety of tasks including, but not limited to, capturing a video image with the smart camera and the metadata associated with the image (e.g. the time and date that image was captured); encrypting each frame of video image using the public key; processing the captured video image to generate an enhanced video image from the encrypted frames of the video image; controlling the acquisition and transmission of data; and transmitting an enhanced media stream to a respective hub 24 and/or 26 for further processing and/or further transmission to a server, such as the server 36 of the cloud-based control service system 34, and/or communication with user device(s) 44. It can be appreciated that the main processor 23 and/or the image signal processor may perform additional tasks without deviating from the scope of the present invention. For example, the image signal processor can toggle between: 1) a low power mode in which the image signal processor performs only essential tasks to insure proper operation of the smart camera, thereby minimizing the electrical power drawn from a battery used to power a corresponding monitoring device 18; and 2) an operation mode, in which the image signal processor is awake and capable of performing all programmed tasks.

In order to allow for low and high frequency communication on WLAN 12, it is contemplated for monitoring devices 18 to have two radios operating at different frequencies. Referring again to FIG. 2, a first, "primary" radio 27 operates at a first frequency, typically at a relatively high frequency, typically of 2.4 GHz to 5 GHZ, during period of normal conductivity to perform monitoring and data capture functions such as video capture and transmission, sound transmission, motion sensing, etc. The second or "secondary radio" 29 operates at a second frequency that is immune or at least resistant to resistance from signals that typically jam signals over the first frequency. The second frequency may be of considerably lower frequency in the sub-GHz or even RF range and may have a longer range than the primary radio. It is intended for the secondary radio to be operable, when communications over the primary communication path are disrupted, in order to permit the continued operation of monitoring devices 18, as well as, to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each audience monitoring device 18 to include Bluetooth® or any PAN communications module 36 designated for wireless communication. As is known, modules 36 allows audience monitoring devices 18 to communicate directly with one or more user devices 44 over a wireless Personal Area Network (PAN) 38. Likewise, sensors 20 may include Bluetooth® or any PAN communications module 45 to allow sensor 20 to communicate directly with one or more user devices 44 over a wireless Personal Area Network (PAN) 38, as shown in FIG. 1.

Referring back to FIG. 1, within WLAN 12, multiple communication paths 50 are defined that transmit data between the various components of monitoring system 10. Communication paths 50 include a default or primary communication path 52 providing communication between audience monitoring device 18 and the base station hub 26, and a fail-over or fallback secondary communication path 54 providing communication between monitoring device 18 and the security hub 26. Optionally, some of the monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown.

If the security hub 26 and the associated secondary communication path 54 are not present, the sensors 20 may communicate directly with the base station hub 24 (if present, or the router 28 if the functionality of the base station hub is incorporated into the router) via the primary communication path 52.

As described, electronic monitoring system 10 is configured to implement a seamless OTA communication environment for each client device 16 by implementing a communication path switching strategy as a function of the operational state of primary and/or secondary communication paths, as heretofore described. For example, each monitoring device 18 is configured to acquire data and to transmit it to a respective hub 24 and/or 26 for further processing and/or further transmission to a server such as the server 36 of the cloud-based control service system 34 and/or the user device(s) 44. The server 36 or other computing components of monitoring system 10 or otherwise in the WLAN 12 or WAN 14 can include or be coupled to a microprocessor, a microcontroller or other programmable logic element (individually and collectively considered "a controller") configured to execute a program. For example, as will be described in further detail below, the server 36 may include a computer vision ("CV") program. The CV program is configured to receive data from the monitoring device 18 and apply one or more filters or processes, such as edge detection, facial recognition, motion detection, voice detection, etc., to detected one or more characteristics of the recording such as, but not limited to, identifying one or more individuals on a genus and/or species level within the field-of-view of the monitoring device 18. However, the CV program need not be limited to the server 36, and may be located at other computing components of monitoring system 10. In another example, the controller also may be contained in whole in the monitoring device 18, base station hub 24, security hub 26, and/or the WIFI hub or router 28. Alternatively, interconnected aspects of the controller and the programs executed by it, including but not limited to the CV program, could be distributed in various permutations within the monitoring device 18, the hubs 24 and 26, router 28, and the server 36. This program may be utilized in filtering, processing, categorizing, storing, recalling and transmitting data received from the monitoring device 18 via the hubs 24 and 26, router 28, and server 36.

Figure 3:
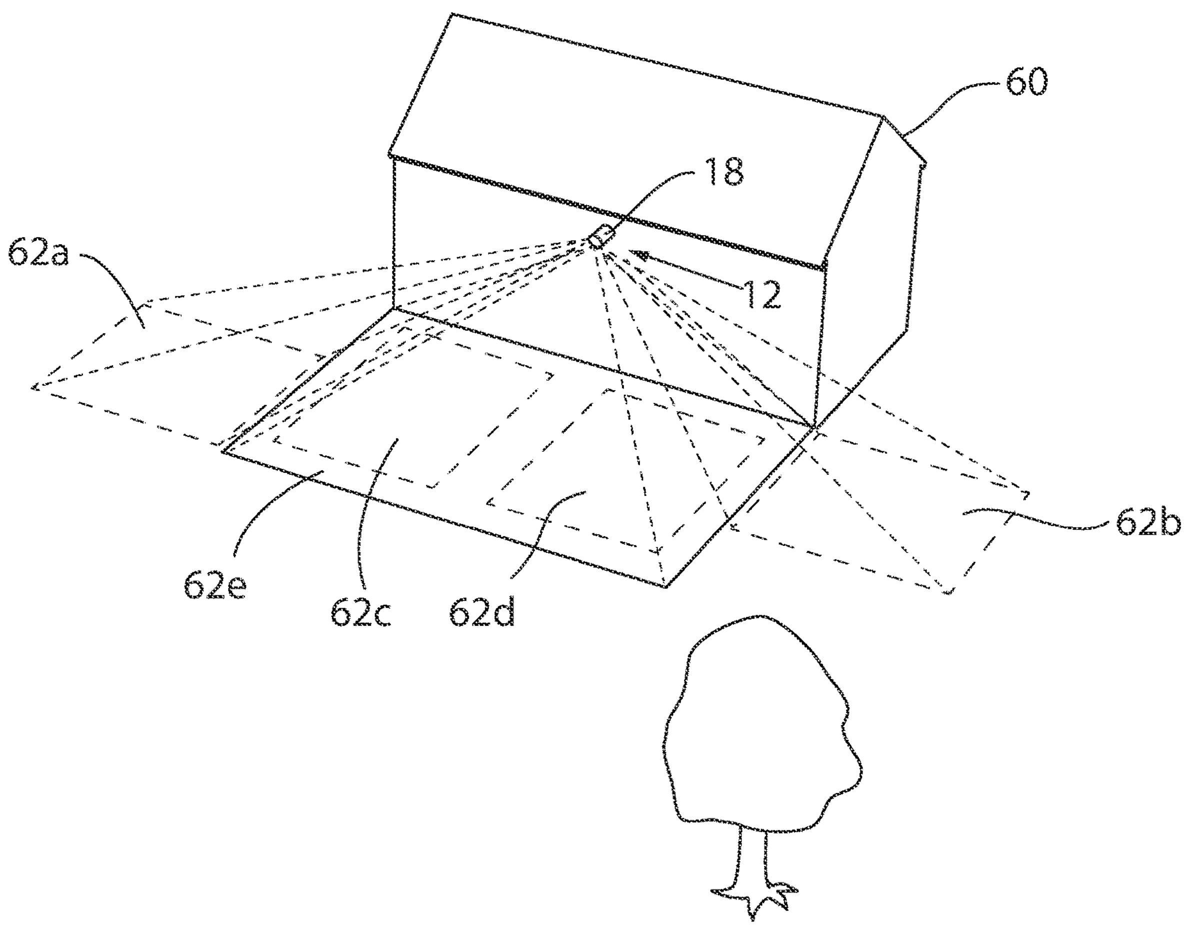
FIG. 3 is a diagram showing various field-of-view of a monitoring device of FIG. 1.

Turning now to FIG. 3, an example of the monitoring device 18 is shown in use attached a structure 60, such as the exterior of a home, building, post, fence, or the like. The monitoring device 18, and more specifically the imaging device 19 and/or the sensors 21 contained therein may be directed to one or more fields-of-view **62*a*-62*e*. In one such embodiment, the one or more fields-of-view 62*a*-62*d* may be discrete or independently defined areas. In such an embodiment, the position and/or orientation of monitoring device 18 may be altered to capture the one or more fields-of-view 62*a*-62*d*. Altering the position and/or orientation of the monitoring device 18 may include a mechanical movement of the monitoring device 18, such as horizontal panning, vertical tilting, rotating, or any combination thereof. An example of such an embodiment would be a monitoring device 18 affixed to a motorized mount, the use of which pans, tilts, and/or rotates the monitoring device 18 repeatedly through a plurality of fields-of-view 62*a*-62*d*, in order to monitor a larger area than a fixed position or stationary camera. Alternatively, the one or more fields-of-view 62*a*-62*d* provided by the monitoring devices 18 may be the result of a relocation of the monitoring device 18, which is otherwise stationary. Examples of such an embodiment include a user intentionally repositioning the field-of-view 62 of the monitoring device 18, the user unintentionally repositioning the field-of-view 62 of the monitoring devices 18, for example during a battery replacement process, or the monitoring device 18 being shifted by a non-user such as an animal or a foreign object striking the monitoring device 18. Alternatively, the filed-of-view of the monitoring device 18 may be oscillate between one or more fields-of-view 62***c*-62*d* that are subsets of a larger field-of-view 62*e*. That is to say that the monitoring device 18 may include a wide area field-of-view 62*e* through the use of lens system, such as a wide-angle lens. A selected subset of the wide area field-of-view 62*e*, or pluralities thereof 62*c*-62*d* may be utilized to provide a more detailed field-of-view 62 at any given time. Such an embodiment would allow for the monitoring device 18 to scan or shift the field-of-view 62 between various views 62*c*-62*d*, without physical movement of the monitoring devices 18. While FIG. 3 illustrates a plurality of fields-of-view 62*a*-62*e* that are essentially defined by their generally horizontal planar area captured by the monitoring device 18, it should be understood that the present invention is not so limited and the corresponding field-of-view 62 and modifications thereto may be directed to any area within the viewing range of the image detector 19 and/or sensors 21 of the monitoring device 18.

Figures 4A, 4B, 4C:
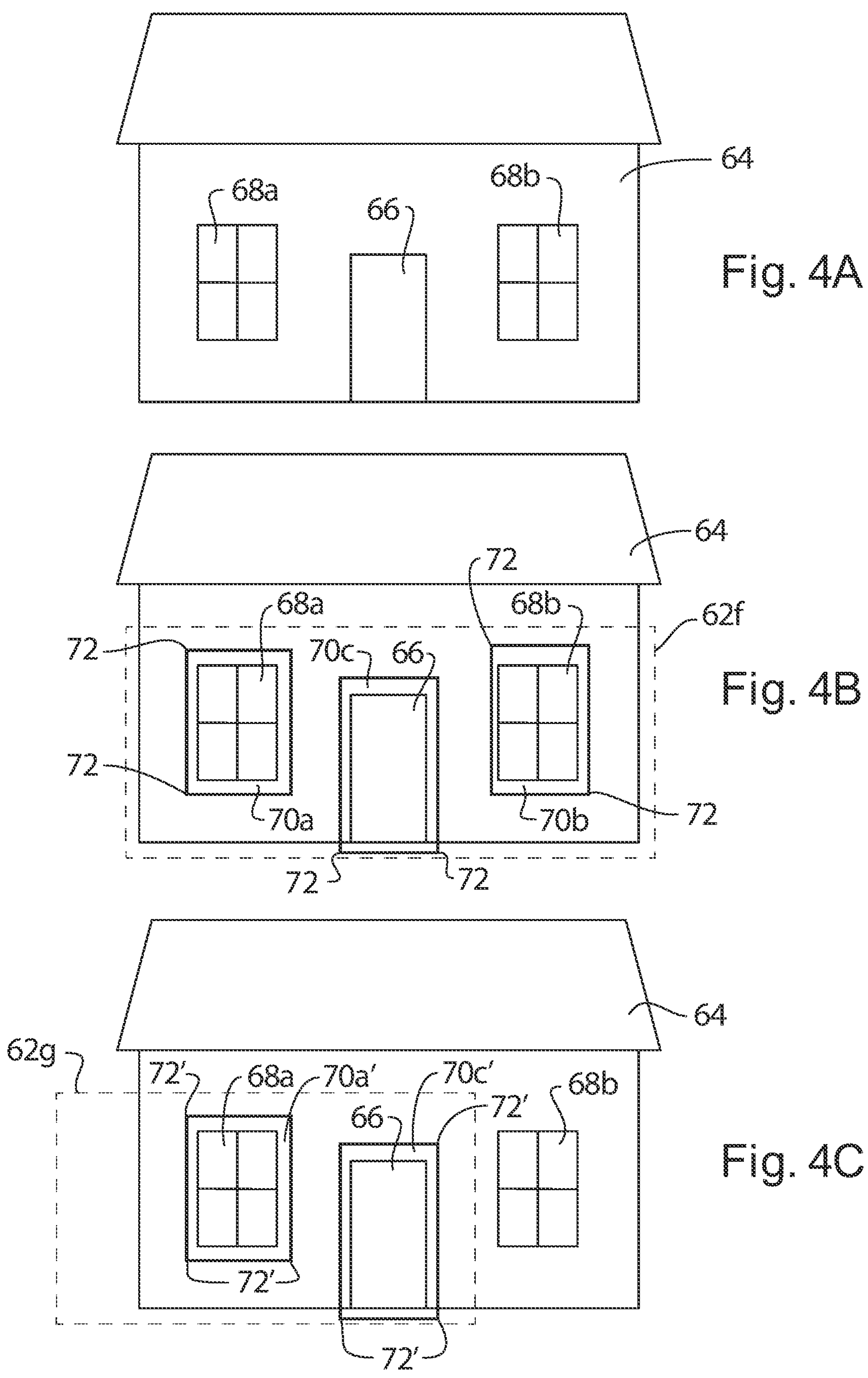
FIG. 4A is front elevation view of a structure subject to monitoring device of FIG. 1.
FIG. 4B is a front elevation view of the structure of FIG. 4A, in which the monitoring device has a first field-of-view.
FIG. 4C is a front elevation view of the structure of FIG. 4A, in which the monitoring device has a second field-of-view.

Turning now to FIGS. 4A-4C, another embodiment of the field-of-view 62 of system 10 according to the present invention is shown as applied to a structure 64, such as a home or building. FIG. 4A illustrated the structure 64 without monitoring device 18 applied field of view 62. In this example structure 64 includes one entrance or door 66 and two windows 68*a*, 68*b*. However, it should be understood that these features of structure 64 are included for the purpose of a nonlimiting example of system 10, and as such the present invention is in no way so limited.

Referring now to FIG. 4B, the initial or first field-of-view 62*f* applied by a monitoring device 18 (not shown) of system 10 is illustrated. In this example, the monitoring device 18 has been positioned such that the first field-of-view 62*f* includes therein the one door 66 and two windows 68*a*, 68*b*. In response to activating the system 10, initial or first image data that corresponds to the first field-of-view 62*f* is transmitted from the monitoring device 18 to the server 36 and user device 44 via the WLAN 50, as was described above. Through the use of the user device 44, a user may place one or more activity zones 70 over selected portions of the first image data. As shown in FIG. 4B, a user defined activity zone 70*a* has been placed over a portion of the image data corresponding to the first window 68*a*, a second activity zone 70*b* over the second window 68*b*, and a third activity zone 70*c* over the door. Defining the location, size and/or shape of the activity zones 70 may include the user defining polygon end points 72 positioned within the first image data. However, it is considered within the scope of the present invention that the CV program may also recommend and/or define the location of activity zones 70 in the first image data.

Once the location of activity zones 70 are specified, system 10 may instruct the user to define the at least one triggering event to be monitored within a given activity zone 68, and the corresponding response thereto. Triggering events may include but are not limited to, detecting motion, detecting sound, identifying a person, identifying an animal, identifying a vehicle, and identifying a parcel. The monitoring devices 18 can monitor for both genus and species level categorized triggering events, such as motion or sound produced by an individual, for example, using imaging device 19 of the monitoring device 18, microphones 21 and/or motion sensors 20, in various configurations, including as described above with respect to FIG. 1. The terms “genus” and “species” as used herein simply refer to a set and a subset of that subset respectively. There can be various levels of genus and species. For example, an individual person can be considered a genus and a child could be a species within that genus. Drilling down a level further, a child under the age of 10 could be a species of the genus of child. Drilling down still a level further, Jill could be a species of the genus children under the age of 10. The levels between the uppermost level levels and the bottom-most level also could be considered “subgenuses.” For the sake of simplicity, unless otherwise noted in a particular example, the term “genus” will encompass both genuses and subgeneses.

If the monitoring devices 18 and or sensors 20 detect a triggering event, for example the presence of an individual within the activity zone 70*c*, the monitoring device 18 can begin capturing and recording data from the field-of-view 62*f*, where the image and sound collected by the monitoring device 18 is transmitted to a respective hub 24 and/or 26 for further processing and/or further transmission to a server such as the server 36 of the cloud-based control service system 34 and/or the user device(s) 44. In addition to capturing and recording first image data from the field-of-view 62*f*, the system 10 may also execute a user specified response. Such responses may include but are not limited to generating an audio alert, generating a video alert, recording image data, generating an audio recording, masking a portion of image data, and/or masking a portion of the audio recording. For example, if a motion triggering event in activity zone 70*c* is processed by the CV program at the server 36 to identify the individual as a specific sub-species of individual, i.e., “Jill”, the system 10 may generate a push notification to the user device 44 indicating that “Jill has returned home,” based upon the user’s specified response instructions to triggering events at the given activity zone 70*c*.

Referring now to FIG. 4C, the altered or second field-of-view 62*g* applied by a monitoring device 18 (not shown) of system 10 is illustrated. In this example, the monitoring device 18 has been altered or repositioned such that the second field-of-view 62*g* differs at least in part from the first field-of-view 62*f*. As illustrated in FIG. 4C, the second field-of-view includes therein the one door 66 and first window 68*a*, but not the second window 68*b*. While the system 10 is active, the altered or second image data that corresponds to the altered or second field-of-view 62*g* is transmitted from the monitoring device 18 to the server 36 and user device 44 via the WLAN 50, as was described above. Upon receipt, second image data is processed by the CV program, which may occur at the server 36, to identify the occurrence of an altered or repositioned monitoring device 18 through changes in the second image data relative to the previously received first image data. In response to identify the occurrence of an altered or repositioned monitoring device 18, the system 10 then generates modified activity zones 70'. As illustrated in FIG. 4C, one or more modified activity zones 70' may be placed over selected portions of the second image data, which correspond to the user placed activity zones 70 in the first image data. In one example, as shown in FIG. 4C, a modified activity zone 70*a'* has been generated by system 10 and placed over a portion of the second image data corresponding to the user defined activity zone 70*a* placed over the first window 68*a* in the first image data. Another modified activity zone 70*c'* has been generated by system 10 and placed over a portion of the second image data corresponding to the user defined activity zone 70*c* placed over the door in the first image data. Notably, given that the monitoring device 18 has been altered or repositioned such that the second field-of-view 62*g* does not include the window 68*b*, the system 10 does not generate a modified activity zone corresponding to user defined activity zone 70*b*. Defining the location, size and/or shape of the modified activity zones 70' may occur through the CV program to generate polygon end points 72' positioned within the second image data that generally correspond to the user defined polygon end points 72 from the first image data. In so doing, the CV program can apply one or more filters or processes, such as image classification, edge detection, object detection, object tracking, and segmentation to generate polygon end points 72' positioned within the second image data that generally correspond to the user defined polygon end points 72 from the first image data. As a result of having system 10 generated modified activity zones 70', the system 10 may continue to monitor without interruption for the occurrence of triggering events within the modified activity zones 70' and generate user specified responses thereto, in the event of the field-of-view 62 of the monitoring device 18 having been altered or repositioned.

Figure 5:
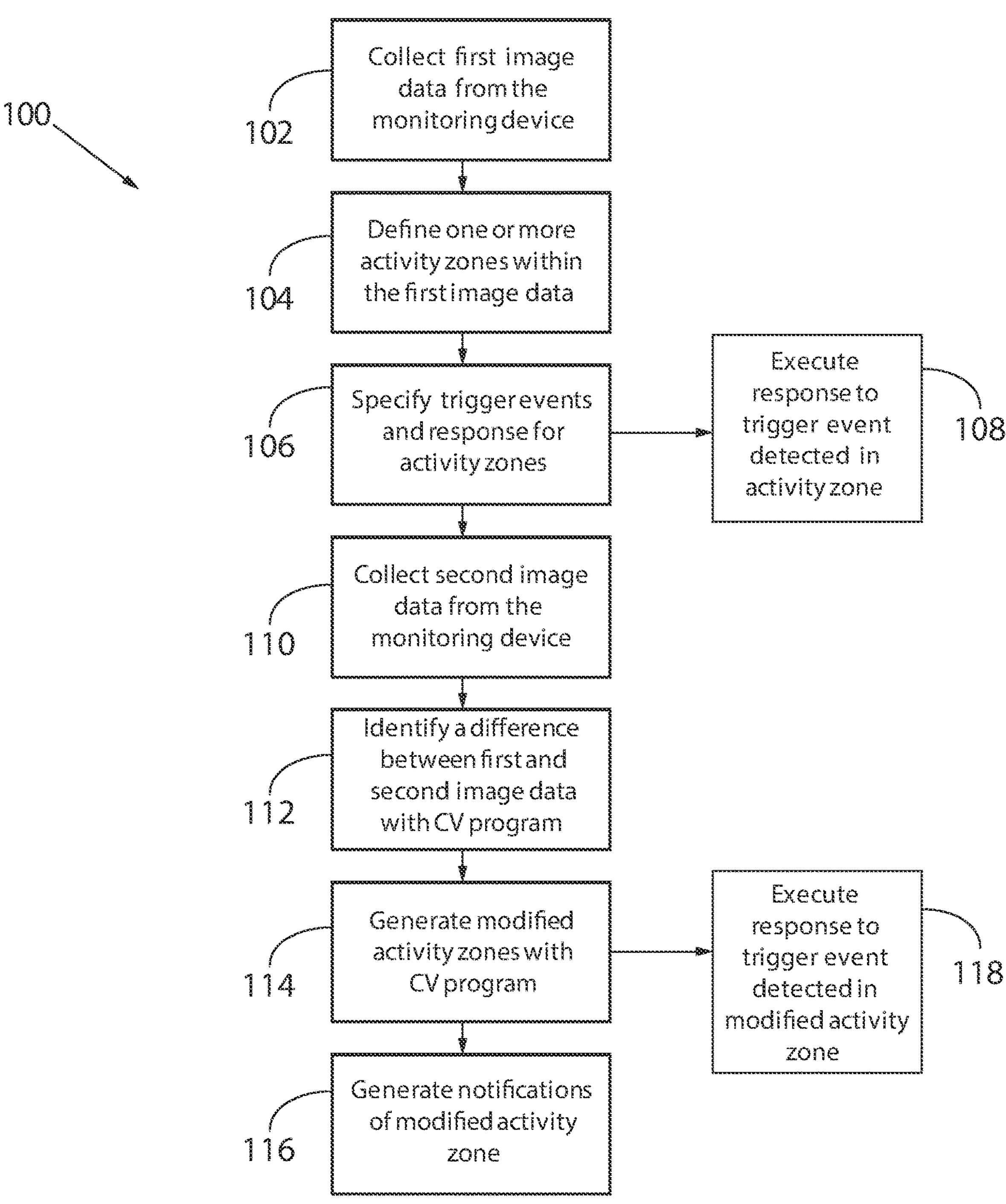
FIG. 5 is a flow chart illustrating a process of monitoring an area according to aspects of the invention.

Turning now to FIG. 5, a method 100 of monitoring an area according to system 10 is provided. At initial block 102, the monitoring device 18, which is positioned to have an initial or first field-of-view 62*f*, generates a first image data that corresponds to the first field-of-view 62*f*. At subsequent block 104, this initial or first image data that corresponds to the first field-of-view 62*f* is provided to the user device 44, via WLAN 50 from the monitoring device 18, whereupon a user may define one or more activity zones 70 over selected portions of the first image data. More specifically, in defining the location, size and/or shape of the activity zones 70, the user, and/or alternatively a CV program, may position polygon end points 72 within the first image data.

At block 106, at least one triggering event to be monitored within a given activity zone 70, and the corresponding response thereto may be specified. Specification of the triggering event and/or response thereto may be user specified, system specified, or any combination thereof. As was described above, the monitoring devices 18 can monitor for both genus and species level categorized triggering events, and generate customized responses according to the specific triggering event that is detected within the activity zone. For example, if the activity zone 70*a* includes window 68*a* and the specified triggering event is motion, the response may be to mask or blur the video portion located within the activity zone 68*a* as to provide privacy for the individual that is visible through widow 68*a*. Alternatively, if the activity zone 70*c* includes door 66 and the specified triggering event is identification of the individual "Jill", the response may be to provide a push notification to the user device 44 indicating that "Jill has returned home."

At subsequent block 108, the system 10 may proceed with monitoring the first field-of-view 62*f* with monitoring device 18, according to the activity zones, triggering events, and response defined in blocks 104, 106, and executing the corresponding response when a triggering event is detected within a given activity zone 70.

Alternatively, at block 110, through the process of continuous monitoring, the monitoring device 18 may provide to the system 10 a second image data that corresponds to a second field-of-view 62*g* that differs at least in part from the first field-of-view 62*f* in response to the monitoring device 18 having been moved, repositioned, etc.

At subsequent block 112, the second image data collected by the monitoring device 18 and received by the server 36 are processed by the CV program to identify a difference between the first image data and the second image data. In so doing, the CV program may apply one or more filters or processes, such as image classification, edge detection, object detection, object tracking, and segmentation to identify a difference between the first and second image data that is indicative repositioning the monitoring device 18 from a first position corresponding to the first field-of-view to a second position corresponding to the second field-of-view. In one embodiment, repositioning the monitoring device 18 may include horizontal panning, vertical tilting, rotation and combinations thereof, unintentional or intentional physical movement of the monitoring device 18, or scanning, i.e., oscillating between subsets of a larger field-of-view 62*e*.

After identifying a difference between the first and second image data, the method 100 proceeds to block 114, where one or more modified activity zones 70' are generated through the CV program. The one or more modified activity zones 70' may be placed over selected portions of the second image data, which correspond to the user placed activity zones 70 in the first image data. More specifically, defining the location, size and/or shape of the modified activity zones 70' may occur through the CV program to generate polygon end points 72' positioned within the second image data that generally correspond to the user defined polygon end points 72 from the first image data. In so doing, the CV program may utilize one or more filters or processes, such as image classification, edge detection, object detection, object tracking, and segmentation to generate polygon end points 72' positioned within the second image data that generally correspond to the user defined polygon end points 72 from the first image data.

Optionally, at block 116 a notification, such as a push notification sent to user device 44, may be generated in order to alert the user to the generation of the modified activity zones 70' as a results of the identified movement or repositioning of the monitoring device 18. This notification may allow the user to investigate the repositioning of the monitoring device 18, if it occurred unintentionally, and/or verify the accuracy of the modified activity zone 70' placement within the second image data.

As a result of having generated the modified activity zones 70' at block 114, the method 100 may continue to perform uninterrupted monitoring for the occurrence of trigger event within the modified activity zones 70' after field-of-view 62 of the monitoring device 18 has been altered or repositioned. At block 118, a response to a trigger event having occurred within a modified activity zone 70' may be executed when a trigger event is detected within a given activity zone 70', according to the trigger events and response defined in block 106.

Figure 6A:
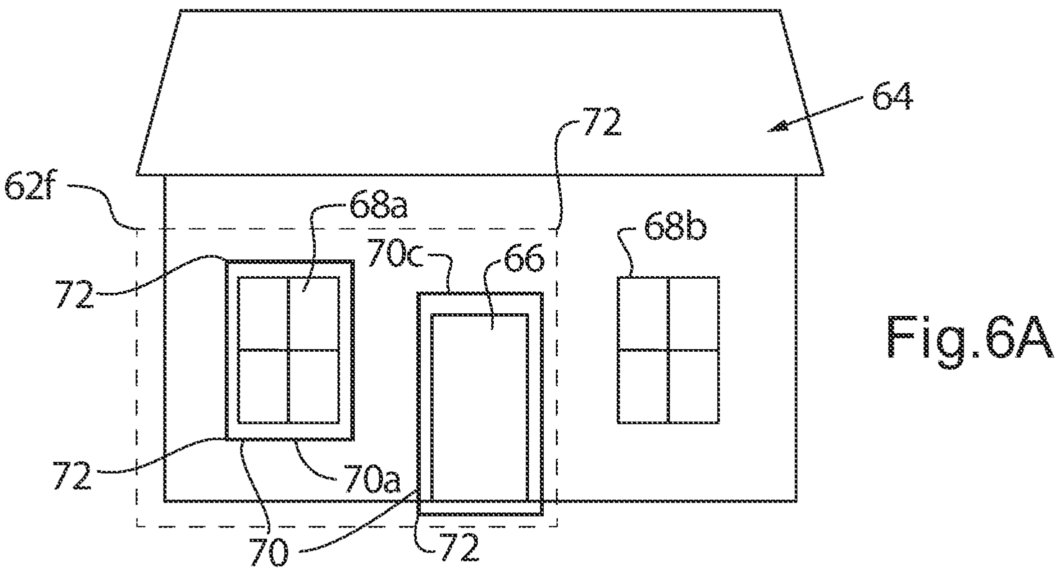
FIG. 6A is a front elevation view of the structure of FIG. 4A, in which the monitoring device has an alternate first field-of-view.
Figure 6B:
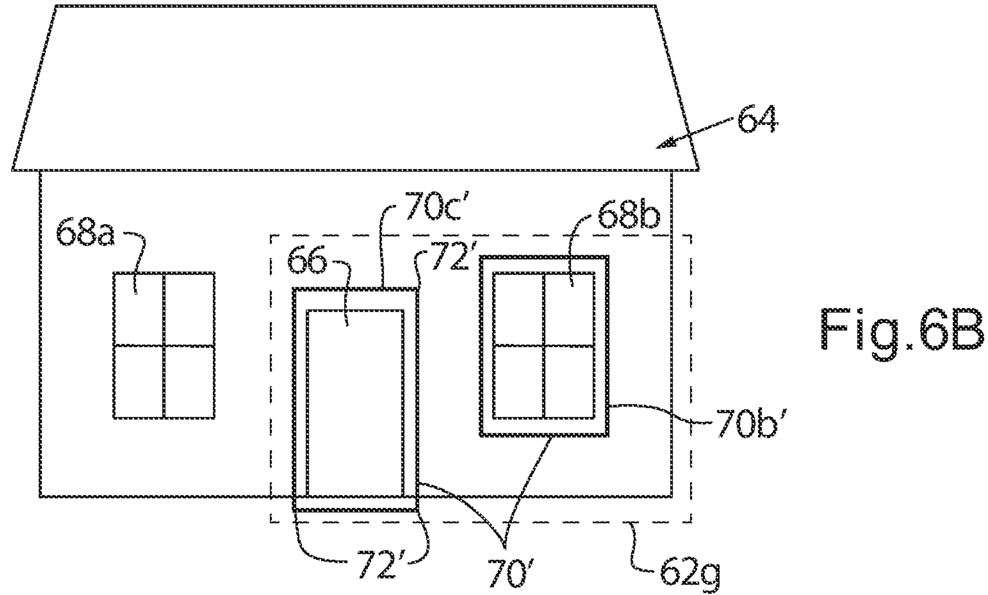
FIG. 6B is a front elevation view of the structure of FIG. 4A, in which the monitoring device has an alternate second field-of-view.

Referring to FIGS. 6A-6B, an alternate example of system 10 in accordance with the present invention is shown as applied to a structure 64, such as a home or building, FIG. 4A. In this example structure 64 includes one entrance or door 66 and two windows 68*a*, 68*b*. However, it should be understood that these features of structure 64 are included for the purpose of a nonlimiting example of system 10, and, as such, the present invention is in no way so limited.

Referring now to FIG. 6A, the initial or first field-of-view 62*f* applied by a monitoring device 18 (not shown) of system 10 is illustrated. In this example, the monitoring device 18 has been positioned such that the first field-of-view 62*f* includes door 66 and a first window 68*a* therein. In response to activating system 10, initial or first image data that corresponds to the first field-of-view 62*f* is transmitted from the monitoring device 18 to the server 36 and user device 44 via the WLAN 50, as was described above. Through the use of the user device 44, a user may place one or more activity zones 70 over selected portions of the first image data. By way of example, a user defined activity zone 70*a* has been placed over a portion of the image data corresponding to the first window 68*a* and a second activity zone 70*c* has been placed over a portion of the image data corresponding to the door 66. As noted above, defining the location, size and/or shape of the activity zones 70 may include the user defining polygon end points 72 positioned within the first image data. However, it is considered within the scope of the present invention that the CV program may also recommend and/or define the location of activity zones 70 in the first image data.

Once the location of activity zones 70 are specified, configuration data associated with any objects captured within activity zones 70, e.g. first window 68*a* in first activity zone 70*a* and door 66 in second activity zone 70*c*, are saved in computer-readable memory associated with the computing components of monitoring system 10 executing the CV program, e.g. server 36. The computer-readable memory associated with computing components of monitoring system 10 executing the CV program further includes a database corresponding to the configuration of potential objects to be monitored, for reasons hereinafter described. Monitoring system 10 may further prompt a user to specify treatment of an object captured within first field-of-view 62*f*. For example, a user may choose to mask first window 68*a* captured with first activity zone 70*a* in any video or video alert displayed to a user. Alternatively, a user may choose to mask the face of any human entering first field-of-view 62*f*. The selected treatments of the object are also stored computer-readable memory associated with computing components of monitoring system 10 executing the CV program.

It is further contemplated for monitoring system 10 to prompt a user to define the at least one trigger event to be monitored within a given activity zone 70, outside of a given activity zone 70, or both inside and outside of the given activity zone 70, and the corresponding response thereto. Triggering events may include, but are not limited to, detecting motion, detecting sound, identifying a person, identifying an animal, identifying a vehicle, and identifying a parcel. These triggering event may be generic, sub-generic, or specific as discussed above. The monitoring devices 18 can monitor for both genus and species level categorized triggering events, such as motion or sound produced by an individual, for example, using imaging device 19 of the monitoring device 18, microphones 21 and/or motion sensors 20, in various configurations, including as described above with respect to FIG. 1.

If the monitoring devices 18 and or sensors 20 detect a triggering event, for example the presence of an individual within the activity zone 70*c*, the monitoring device 18 can begin capturing and recording data from the field-of-view 62*f*, where the image and sound collected by the monitoring device 18 is transmitted to a respective hub 24 and/or 26 for further processing and/or further transmission to a server such as the server 36 of the cloud-based control service system 34 and/or the user device(s) 44. In addition to capturing and recording first image data from the field-of-view 62*f*, the system 10 may also execute a user-specified response. Such responses may include, but are not limited to, generating an audio alert, generating a video alert, recording image data, generating an audio recording, masking a portion of image data, and/or masking a portion of the audio recording. For example, if a motion trigger event in activity zone 70*c* is processed by the CV program at the server 36 to identify the individual as a specific sub-species of individual, i.e., "Jill", the system 10 may generate a push notification to the user device 44 indicating that "Jill has returned home," based upon the user's specified response instructions to trigger events at the given activity zone 70*c*.

Referring now to FIG. 6B, an altered or second field-of-view 62*g* applied by a monitoring device 18 (not shown) of system 10 is illustrated. In this example, the monitoring device 18 has been altered or repositioned (e.g, by horizontal panning, vertical tilting, rotation and combinations thereof, unintentional or intentional physical movement of the monitoring device 18, scanning/oscillating between subsets of a larger field-of-view 62*e*, or by simply following an object of interest in accordance with pre-programmed or user defined instructions) such that the second field-of-view 62*g* differs at least in part from the first field-of-view 62*f*. As illustrated in FIG. 6B, the second field-of-view includes therein the one door 66 and second window 68*b*, but not the first window 68*a*. While the system 10 is active, the altered or second image data that corresponds to the altered or second field-of-view 62*g* is transmitted from the monitoring device 18 to the server 36 and user device 44 via the WLAN 50, as was described above. Upon receipt, second image data is processed by the CV program, which may occur at the server 36, to identify the occurrence of an altered or repositioned monitoring device 18 through changes in the second image data relative to the previously received first image data. In response to identify the occurrence of an altered or repositioned monitoring device 18, the system 10 then generates modified activity zones 70'. More specifically, one or more modified activity zones 70' may be placed over selected portions of the second image data, which correspond to the user placed activity zones 70 in the first image data. For example, a modified third activity zone 70*c*' has been generated by system 10 and placed over a portion of the second image data corresponding to the user defined activity zone 70*c* placed over door 66 in the first image data, in a matter heretofore described.

In addition, it is contemplated for the CV program to access the configuration data associated with any objects captured within activity zones 70, e.g. first window 68*a* in first activity zone 70*a*, and utilizing the database of potential objects, determine if any objects which are the same or substantial similar to any object captured within activity zones 70, e.g. first window 68*a* in first activity zone 70*a*, are located in the second field-of-view 62*g*. If the same or substantial similar objects captured within activity zones 70 in the first field-of-view 62*f* are located in the second field-of-view 62*g*, the CV program generates another modified activity zone 70*b*' over a portion of the second image data corresponding to the same or substantial similar object. For example, a modified second activity zone 70*b*' is generated and placed over a portion of the second image data corresponding second window 68*b*.

Further, if the same or substantial similar objects captured within activity zones 70 in the first field-of-view 62*f* are located in the second field-of-view 62*g*, the CV program may treat the same or substantial similar objects in the second field-of-view 62*g* in the same manner as the object captured within modified second activity zone 70*b*'. Similarly, the CV program may mask second window 68*b* captured within modified second activity zone 70*b*' in any video or video alert displayed to a user. Alternatively, the CV program may mask the face of any human entering second first field-of-view 62_g_.

In a similar manner, it is further contemplated for monitoring system 10 modify the at least one trigger event previously defined within first field-of-view 62_f_. More specifically, in response to the monitoring device 18 being altered or repositioned such that monitoring device 18 is directed at second field-of-view 62_g_, the triggering events are adjusted to occur within a given modified activity zones 70', outside of a given modified activity zone 70' or inside and outside of the given activity zone 70' such that monitoring device 18 continues to perform uninterrupted monitoring for the occurrence of trigger event after field-of-view 62 of the monitoring device 18 has been altered or repositioned. A response to a trigger event having occurred within a modified activity zone 70' may be executed when a trigger event is detected within a given modified activity zone 70', as heretofore described.

It can be appreciated that as described, system 10 of the present invention allows for the dynamic modifying of the position of activity zones in response to a change in a field-of-view of the monitoring device.

Figure 7:
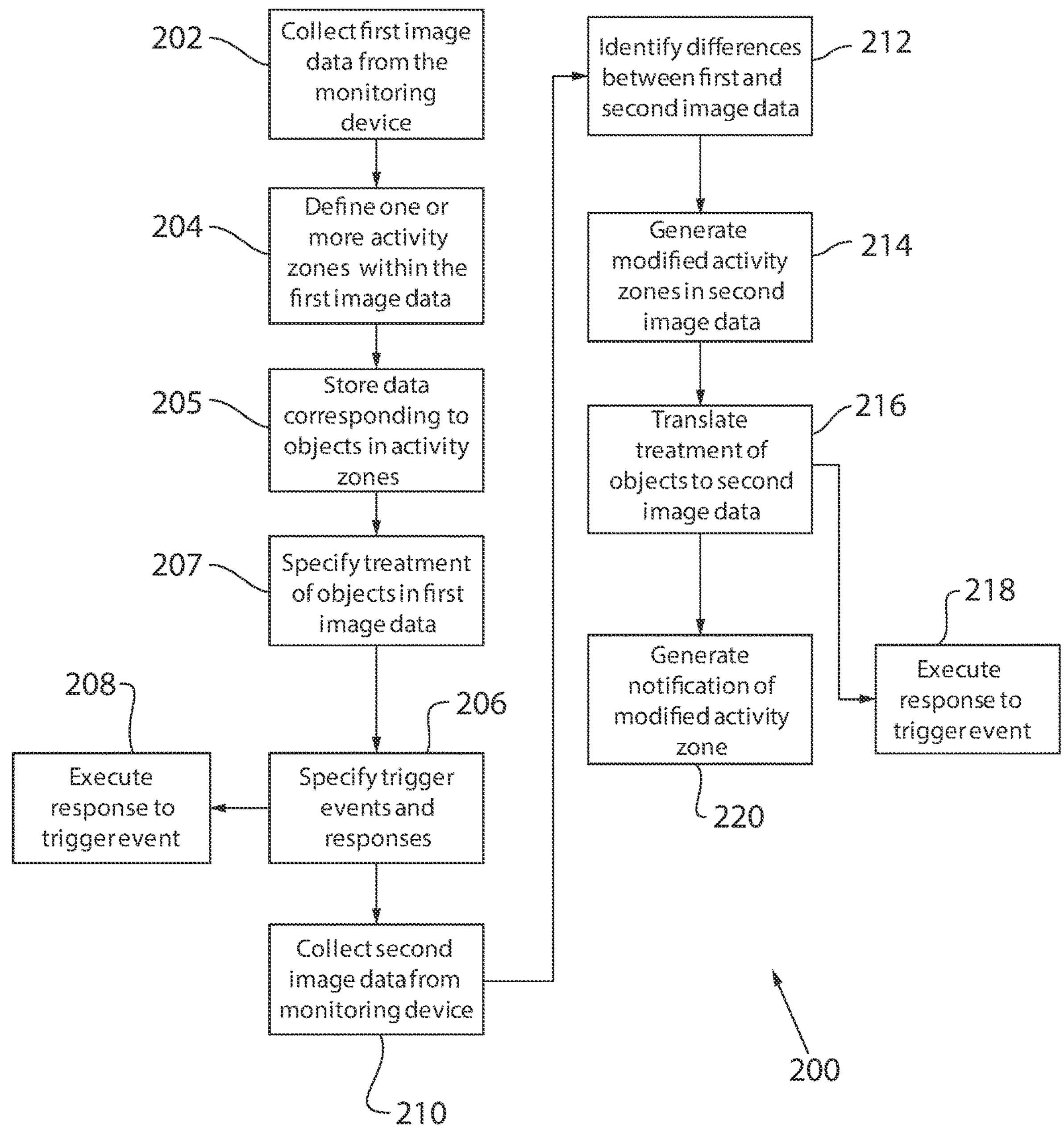
FIG. 7 is a flow chart illustrating an alternate, exemplary process of monitoring an area according to aspects of the invention.

Referring to FIG. 7, a method 200 of monitoring an area according to system 10 is provided. At initial block 202, the monitoring device 18, which is positioned to have an initial or first field-of-view 62_f_, generates a first image data that corresponds to the first field-of-view 62_f_. At subsequent block 204, this initial or first image data that corresponds to the first field-of-view 62_f_ is provided to the user device 44, via WLAN 50 from the monitoring device 18, whereupon a user may define one or more activity zones 70 over selected portions of the first image data. More specifically, in defining the location, size and/or shape of the activity zones 70, the user, and/or alternatively a CV program, may position polygon end points 72 within the first image data.

Once the location of activity zones 70 are specified, configuration data associated with any objects captured within activity zones 70, e.g. first window 68_a_ in first activity zone 70_a_ and door 66 in second activity zone 70_c_, are saved in computer-readable memory associated with the computing components of monitoring system 10 executing the CV program, e.g. server 36, block 205. Further, a user may specify treatment of an object captured within first field-of-view 62_f_, block 207.

At least one trigger event to be monitored within a given activity zone 70, and the corresponding response thereto may be specified, block 206. Specification of the trigger event and/or response thereto may be user specified, system specified, or any combination thereof. As was described above, the monitoring devices 18 can monitor for both genus and species level categorized triggering events, and generate customized responses according to the specific triggering event that is detected within the activity zone. For example, if the activity zone 70_a_ includes window 68_a_ and the specified triggering event is motion, the response may be to mask or blur the video portion located within the activity zone 68_a_ as to provide privacy for the individual that is visible through widow 68_a_. Alternatively, if the activity zone 70_c_ includes door 66 and the specified triggering event is identification of the individual "Jill", the response may be to provide a push notification to the user device 44 indicating that "Jill has returned home."

At subsequent block 208, the system 10 may proceed with monitoring the first field-of-view 62_f_ with monitoring device 18, according to the activity zones, triggering events, and response defined in blocks 204 and 206, and executing the corresponding response when a triggering event is detected within a given activity zone 70.

Through the process of continuous monitoring, monitoring device 18 may be moved, repositioned, etc. As such, monitoring device 18 may provide a second image data to system 10 that corresponds to a second field-of-view 62_g_ that differs at least in part from the first field-of-view 62_f_, block 210. The second image data collected by the monitoring device 18 and received by the server 36 are processed by the CV program to identify a difference between the first image data and the second image data, block 212. In so doing, the CV program may apply one or more filters or processes, such as image classification, edge detection, object detection, object tracking, and segmentation to identify a difference between the first and second image data that is indicative repositioning the monitoring device 18 from a first position corresponding to the first field-of-view to a second position corresponding to the second field-of-view. In one embodiment, repositioning the monitoring device 18 may include horizontal panning, vertical tilting, rotation and combinations thereof, unintentional or intentional physical movement of the monitoring device 18, or scanning, i.e., oscillating between subsets of a larger field-of-view 62_e_.

After identifying a difference between the first and second image data, the one or more modified activity zones 70' are generated through the CV program, as heretofore described, block 214. More specifically, one or more modified activity zones 70' may be placed over selected portions of the second image data, which correspond to the user placed activity zones 70 in the first image data. For example, a modified third activity zone 70_c_' has been generated by system 10 and placed over a portion of the second image data corresponding to the user defined activity zone 70_c_ placed over door 66 in the first image data, in a matter hereto fore described. Further, the CV program accesses the configuration data associated with any objects captured within activity zones 70, e.g. first window 68_a_ in first activity zone 70_a_, and utilizing the database of potential objects, determine if any objects which are the same or substantial similar to any object captured within activity zones 70, e.g. first window 68_a_ in first activity zone 70_a_, are located in the second field-of-view 62_g_, block 216. If the same or substantial similar objects captured within activity zones 70 in the first field-of-view 62_f_ are located in the second field-of-view 62_g_, the CV program generates another modified activity zone 70_b_' over a portion of the second image data corresponding to the same or substantial similar object. Likewise, in response to the monitoring device 18 being altered or repositioned such that monitoring device 18 is directed at second field-of-view 62_g_, the triggering events are adjusted to occur within a given modified activity zones 70', outside of a given modified activity zone 70' or inside and outside of the given activity zone 70' such that monitoring device 18 continues to perform uninterrupted monitoring for the occurrence of triggering event after field-of-view 62 of the monitoring device 18 has been altered or repositioned, block 218. A push notification to the user device 44 may be generated, block 220, indicating that the activity zone 70 have been modified.

As a result of having generated the modified activity zones 70' at block 214, the method 200 may continue to perform uninterrupted monitoring for the occurrence of triggering event within the modified activity zones 70' after first field-of-view 62_f_ of the monitoring device 18 has been altered or repositioned. A response to a triggering event having occurred within a given modified activity zones 70', outside of a given modified activity zone 70' or inside and outside of the given activity zone 70' may be executed when a triggering event is detected within a given modified activity zone 70', according to the triggering events and response defined in block 206. The response may, for example, masking, blurring, and/or overlaying of an image of a detected object and/or masking and/or muting of audio associated with the object(s).

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

We claim:

1. A method of area monitoring, comprising:

generating a first image data with a camera having a first field-of-view that encompasses a first physical area;

defining a first activity zone encompassing a first area located at a first location within the first field-of-view;

identifying an object in the first activity zone;

after the camera moves such that the first field of view of the camera is replaced with a second field-of-view, the second field-of-view differing at least in-part from the first field-of-view and encompassing a second physical area that differs, at least in part, from the first physical area, generating a second image data with the camera having the second field-of view; and in response to the camera having the second field of view, automatically updating at least a portion of the first activity zone to define a second activity zone having second location that is shifted within the second field-of-view as compared to the first location of the first activity zone within the first field-of-view, the second activity zone encompassing the object.

2. The method of claim 1, wherein updating the at least the portion of the first activity zone additionally includes:

modifying the first activity zone such that the second area within the second image data corresponds to the first area within the first image data; and responding to a triggering event detected within or outside of the first activity zone of the second area.

3. The method of claim 2, wherein:

the first image data includes a plurality of activity zones including the first activity zone and at least one additional activity zone; and each activity zone of the plurality of activity zones is configured to be modified from the corresponding first area within the first image data to the corresponding second area within the second image data in response to movement of the camera.

4. The method of claim 2, wherein movement moving the camera includes repositioning the camera from a first position corresponding to the first field-of-view to a second position corresponding to the second field-of-view.

5. The method of claim 4, wherein the repositioning of the camera includes at least one of horizontal panning, vertical tilting, rotation and combinations thereof.

6. The method of claim 2, further comprising digitally scanning the camera view between the first field-of-view and the second field-of-view, wherein the first field-of-view and the second field-of-view are each a subset of a third field-of-view.

7. The method of claim 2, wherein defining the first activity zone further comprises a user defining polygon end points within the first image data and defining one or more responses to at least one triggering event detected within or outside the first activity zone.

8. The method of claim 7, wherein the modifying the activity zone further comprises providing the first and second image data to a computer vision system and positioning polygon end points within the second image data that correspond to the user defined polygon end points within the first image data.

9. The method of claim 8, wherein the computer vision system applies one or more of image classification, edge detection, object detection, object tracking, and segmentation.

10. The method of claim 1, wherein the first location is defined by the user through interfacing with a user device in communication with the camera.

11. A method of area monitoring, comprising:

placing a camera in a first position;

while the camera is in the first position;

generating a first image data with the camera having a first field-of-view encompassing a first physical area, causing an image of the first field-of-view to be displayed on a user device comprising one of a desktop computer, a laptop computer, a tablet, and a smart phone;

manually interfacing with the user device to define an activity zone within the first image data of the first field-of-view, the activity zone being positioned in a first location in the first field of view, the activity zone containing at least one stationary object;

using a sensor of the monitoring system, detecting a triggering event; and in response to detection of the triggering event, capturing and storing image data from the first field-of-view; and in response to movement of the camera to as second position having a second field-of-view that is different from the first position in the first field-of-view, that encompasses a physical area that differs, at least in part, from the first physical area, and in which the activity zone excludes the stationary object; and automatically updating the activity zone to be positioned in a location in the second field of view that is different from the first location in the first field-of-view, the updated activity zone containing the stationary object.

12. The method of claim 11, further comprising:

storing data corresponding to the object, the data corresponding to the identity of the stationary object;

after the camera moves to the second position, determining if an object is in the second field-of-view utilizing the data corresponding to the identity of the object, and updating the activity zone if it is determined that the activity zone excludes the identified stationary object.

13. The method of claim 11, wherein the stationary object is a first object of a plurality of known stationary objects, the method further comprising:

storing data corresponding to the object; and, after moving the camera to the second position determining if a second stationary object of the plurality of stationary objects is in the second field-of-view.

14. The method of claim 12, further comprising masking, blurring, and/or overlaying the stationary object in the first field-of-view and/or muting or overlaying an audio associated with the stationary object, and, if the stationary object is in the second field-of-view, masking, blurring, and/or overlaying the stationary object in the second field-of-view and/or overlaying or muting an associated with the stationary object.

15. An electronic monitoring system, comprising:

a camera moveable between a first position wherein the camera has a first field-of-view encompassing a first physical area and a second position wherein the camera has a second field-of view that differs at least in-part from the first field-of-view and that encompasses a second physical area that differs, at least in part, from the first physical area, the first field-of-view generating a first image data and the second field-of-view generating a second image data;

a user device configured to:

receive the first image data; and define an activity zone being located at a first location within the first field-of-view and encompassing an object;

a computer-readable memory for storing the data corresponding to the object; and an electronic processor executing a stored program and receiving the first image data from the camera to generate an alert in response to the occurrence of a triggering event detected by the electronic monitoring system, the electronic processor being configured, in response to movement of the camera from the first position to the second position, to automatically modify the activity zone to a second location in the second field-of-view that is different from the first location in the first field-of-view, the modified activity zone encompassing the object.

16. The electronic monitoring system of claim 15, wherein the stored program includes a computer vision system configured to apply one or more of image classification, edge detection, object detection, object tracking, and segmentation to identify a difference between the first image data and the second image data and in response position polygon end points within the second image data that correspond to the user defined polygon end points within the first image data as to define the activity zone to be at a second area within the second image data that corresponds to the first area within the first image data.

17. The electronic monitoring device of claim 15, wherein the stored program is configured to determine if the object is in the second field-of-view utilizing data corresponding to the object.

18. The electronic monitoring device of claim 17, wherein the stored program is configured to mask the object in the first field-of-view, and, if the object is in the second field-of-view, mask the object in the second field-of-view.

19. The electronic monitoring device of claim 15, wherein the object is a first object of a plurality of objects, wherein the stored program is configured to determine if a second object of the plurality of objects is in the second field-of-view utilizing data corresponding to the object.

* * * * *